US011449156B1

(12) United States Patent
Li

(10) Patent No.: US 11,449,156 B1
(45) Date of Patent: Sep. 20, 2022

(54) TOUCHPAD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/408,831

(22) Filed: Aug. 23, 2021

(30) Foreign Application Priority Data

Apr. 8, 2021 (TW) .................................. 110112822

(51) Int. Cl.
*G06F 3/041* (2006.01)
*G06F 3/0354* (2013.01)
*G06F 1/16* (2006.01)

(52) U.S. Cl.
CPC .......... *G06F 3/03547* (2013.01); *G06F 1/169* (2013.01)

(58) Field of Classification Search
CPC ....... G06F 1/169; G06F 3/03547; G06F 3/041
See application file for complete search history.

(56) References Cited

U.S. PATENT DOCUMENTS

| 8,982,062 | B2* | 3/2015 | Bos | G06F 3/04883 |
| | | | | 345/173 |
| 9,069,394 | B2* | 6/2015 | Clayton | G06F 3/03547 |
| 9,292,051 | B2* | 3/2016 | Takata | G06F 1/169 |
| 9,465,416 | B2* | 10/2016 | Shen | G06F 1/1692 |
| 9,490,088 | B2* | 11/2016 | Kagayama | A63F 13/285 |
| 9,542,016 | B2* | 1/2017 | Armstrong-Muntner | |
| | | | | G06F 3/042 |
| 10,180,739 | B2* | 1/2019 | Kitamura | G06F 1/1662 |
| 10,725,567 | B1* | 7/2020 | Huang | G06F 1/1671 |
| 11,287,907 | B1* | 3/2022 | Li | G06F 3/03547 |
| 2006/0250377 | A1* | 11/2006 | Zadesky | G06F 3/0362 |
| | | | | 345/173 |
| 2013/0207928 | A1* | 8/2013 | Takata | G06F 3/03547 |
| | | | | 345/174 |
| 2019/0243475 | A1* | 8/2019 | Huang | G06F 1/1681 |
| 2019/0384426 | A1* | 12/2019 | Huang | G06F 1/169 |
| 2021/0263556 | A1* | 8/2021 | Degner | G06F 1/169 |
| 2022/0066580 | A1* | 3/2022 | Lin | G06F 3/03547 |
| 2022/0113819 | A1* | 4/2022 | Li | G06F 3/03547 |

FOREIGN PATENT DOCUMENTS

TW        M589816 U       1/2020

* cited by examiner

*Primary Examiner* — Joe H Cheng
(74) *Attorney, Agent, or Firm* — Muncy, Geissler, Olds & Lowe, P.C.

(57) ABSTRACT

A touchpad device includes a substrate, a circuit board, a resilient member, an annular plate, a first linkage member, and a second linkage member. The circuit board is disposed above a top surface of the substrate. The resilient member, the first linkage member, and the second linkage member are disposed between the substrate and the circuit board. The annular plate is fixed around a bottom surface of the circuit board and includes an inner periphery. The inner periphery includes a first side, a second side, a third side, and a fourth side connected to each other. The first linkage member includes a first swing plate, and the first swing plate includes a first outer side and a first inner side. The first inner side is swingably connected to the substrate, and the first outer side is sandwiched between the first limiting member and the circuit board.

19 Claims, 10 Drawing Sheets

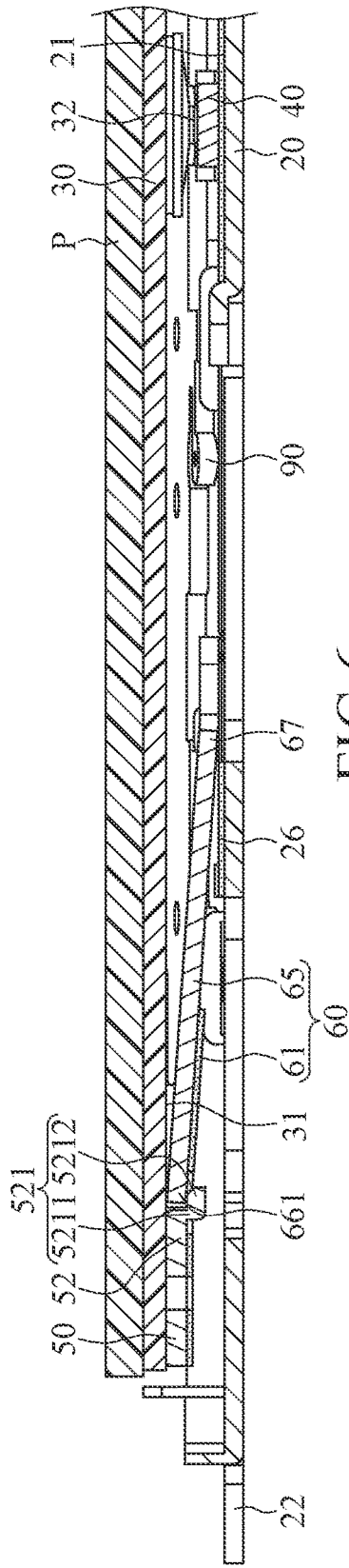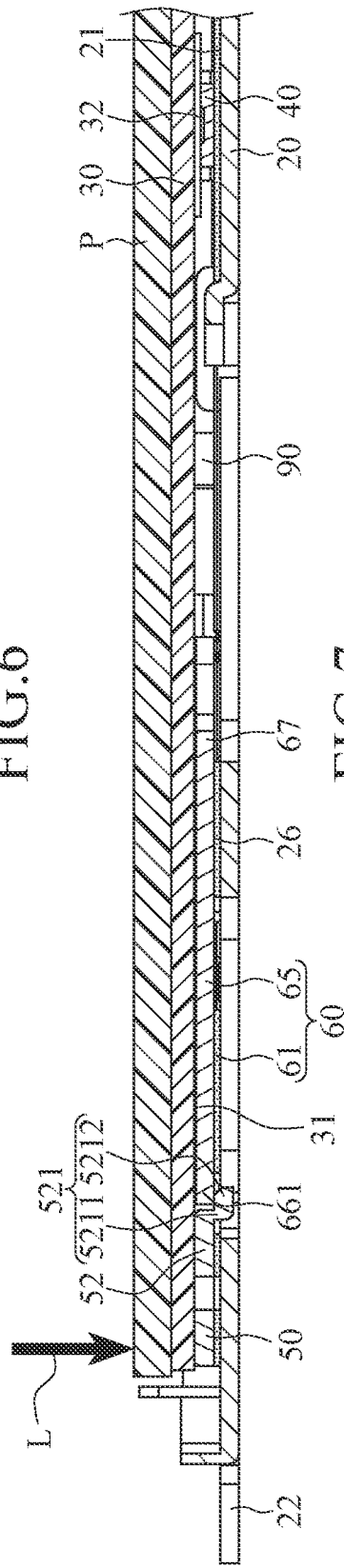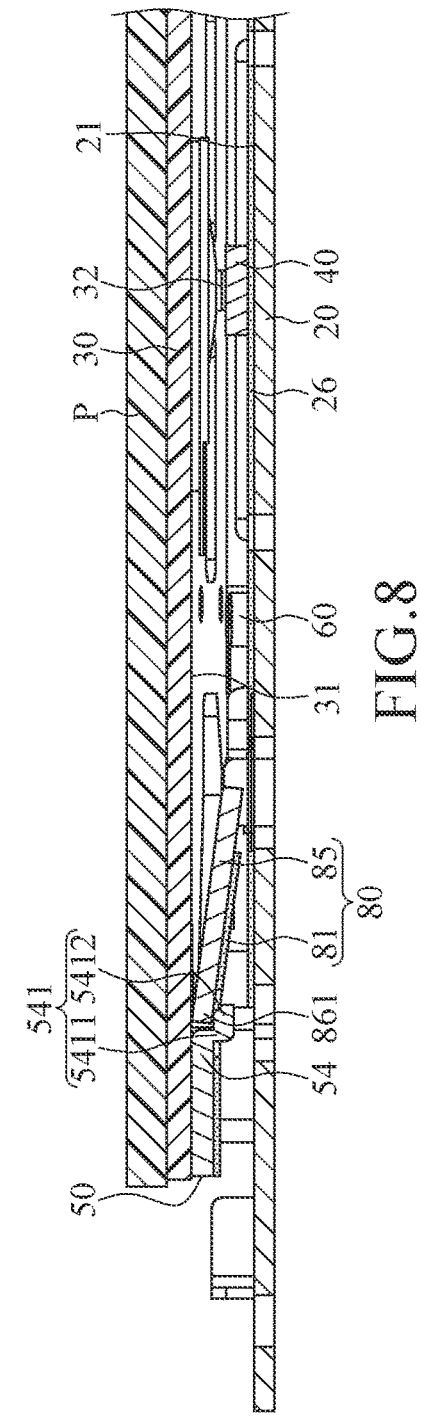

TOUCHPAD DEVICE

CROSS-REFERENCE TO RELATED APPLICATION

This non-provisional application claims priority under 35 U.S.C. § 119(a) to Patent Application No. 110112822 filed in Taiwan, R.O.C. on Apr. 8, 2021, the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the touch panel is pivotally fixed on the substrate through the pivot side. When a portion of the touch panel away from the pivot side is pressed, the touch panel swings downwardly with respect to the substrate by taking the pivot side as the swing axis so as to generate corresponding signal(s).

However, when the user operates the touch panel, he or she would not always accurately press the portion of the touch panel away from the pivot side. Hence, when the user presses the pivot side of the touch panel or presses a region or a corner adjacent to the pivot side, the pressing force of the user cannot allow the touch panel to be moved downwardly smoothly, thus failing to generate corresponding signal(s), and thereby causing inconvenience in operation, influence in operation feelings, and other issues.

In view of this, in one embodiment, a touchpad device is provided. The touchpad device comprises a substrate, a circuit board, a resilient member, an annular plate, a first linkage member, and a second linkage member. The substrate comprises a top surface. The circuit board is disposed above the top surface of the substrate. The circuit board comprises a bottom surface facing the top surface. The resilient member is disposed between the substrate and the circuit board. The resilient member makes the circuit board be kept at a height position. The annular plate is fixed around the bottom surface of the circuit board. The annular plate comprises an inner periphery, and the inner periphery comprises a first side, a second side, a third side, and a fourth side connected to each other. The first side and the second side are opposite sides, the third side and the fourth side are opposite sides, and a first limiting member is disposed on the first side. The first linkage member and the second linkage member are disposed between the substrate and the circuit board. The first linkage member and the second linkage member are respectively disposed at two opposite sides of the resilient member. The first linkage member comprises a first swing plate, and the first swing plate comprises a first outer side and a first inner side. The first swing plate is swingably connected to the substrate with the first inner side. The first outer side is adjacent to the first side, and the first outer side is sandwiched between the first limiting member and the circuit board.

Based on the above, in the touchpad device according to one or some embodiments of the instant disclosure, the first linkage member and the second linkage member are disposed between the substrate and the circuit board. Therefore, when any portion of the touchpad device (e.g., any corner or any edge of the touchpad device) is pressed, the pressing force would always allow the circuit board and the resilient member to come close to, to abut against, and to press each other, thereby generating pressing feelings of the touchpad device for the user. Moreover, the first outer side of the first linkage member is sandwiched between the first limiting member of the annular plate and the circuit board. Therefore, upon operation, the first linkage member can be prevented from having deflection and wobbling, thereby reducing the operation noise of the touchpad device as well as improving the operation feelings for the user.

BRIEF DESCRIPTION OF THE DRAWINGS

The disclosure will become more fully understood from the detailed description given herein below for illustration only, and thus not limitative of the disclosure, wherein:

FIG. 6 illustrates a cross-sectional view along line 6-6 shown in FIG. 5;

FIG. 7 illustrates a schematic view showing that the touchpad device in FIG. 6 is being pressed;

FIG. 8 illustrates a cross-sectional view along line 8-8 shown in FIG. 5;

DETAILED DESCRIPTION

Figure 1:
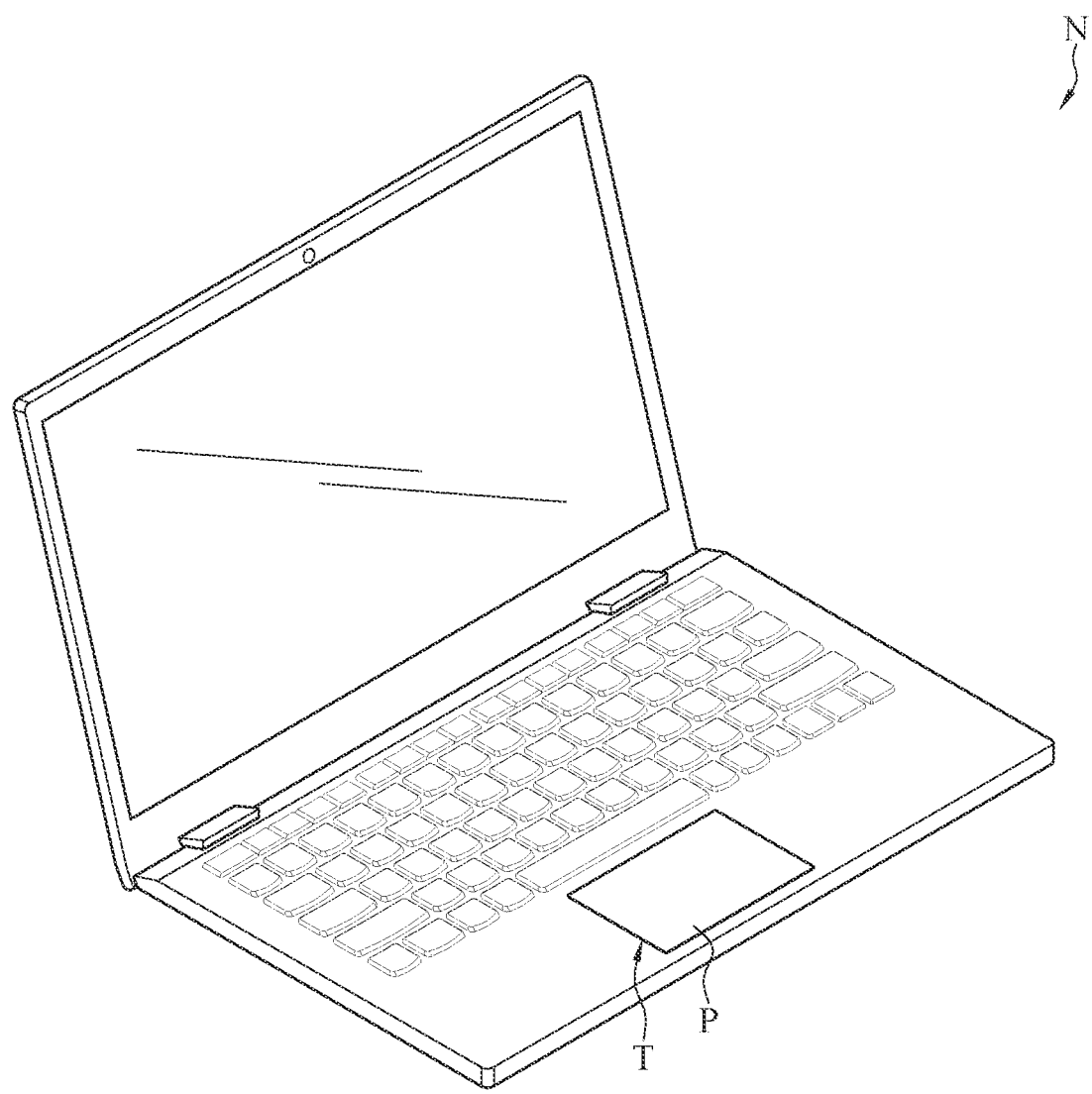
FIG. 1 illustrates a schematic application view of a touchpad device according to an exemplary embodiment of the instant disclosure.

It should be noted that, in the descriptions for the embodiments, the ordinal numbers, e.g., "first", "second", "third", "fourth", etc., are used to describe different elements, and these elements are not limited due to the use of these ordinal numbers. Moreover, for sake of convenience and clarity, the thicknesses or the dimensions of the elements in the drawings are presented exaggeratedly, omittedly, or generally, and the person having ordinary skills in the art still can realize and read. The sizes shown in all the drawings in reference with the specification, are not intended to limit the present disclosure, but merely facilitate the understanding and reading for those skilled in the art. Modifications and variations in different scale or sizes can be made without departing from the spirit of the present disclosure. In all the drawings, the same reference numbers are used to indicate the same or similar elements.

Figure 2:
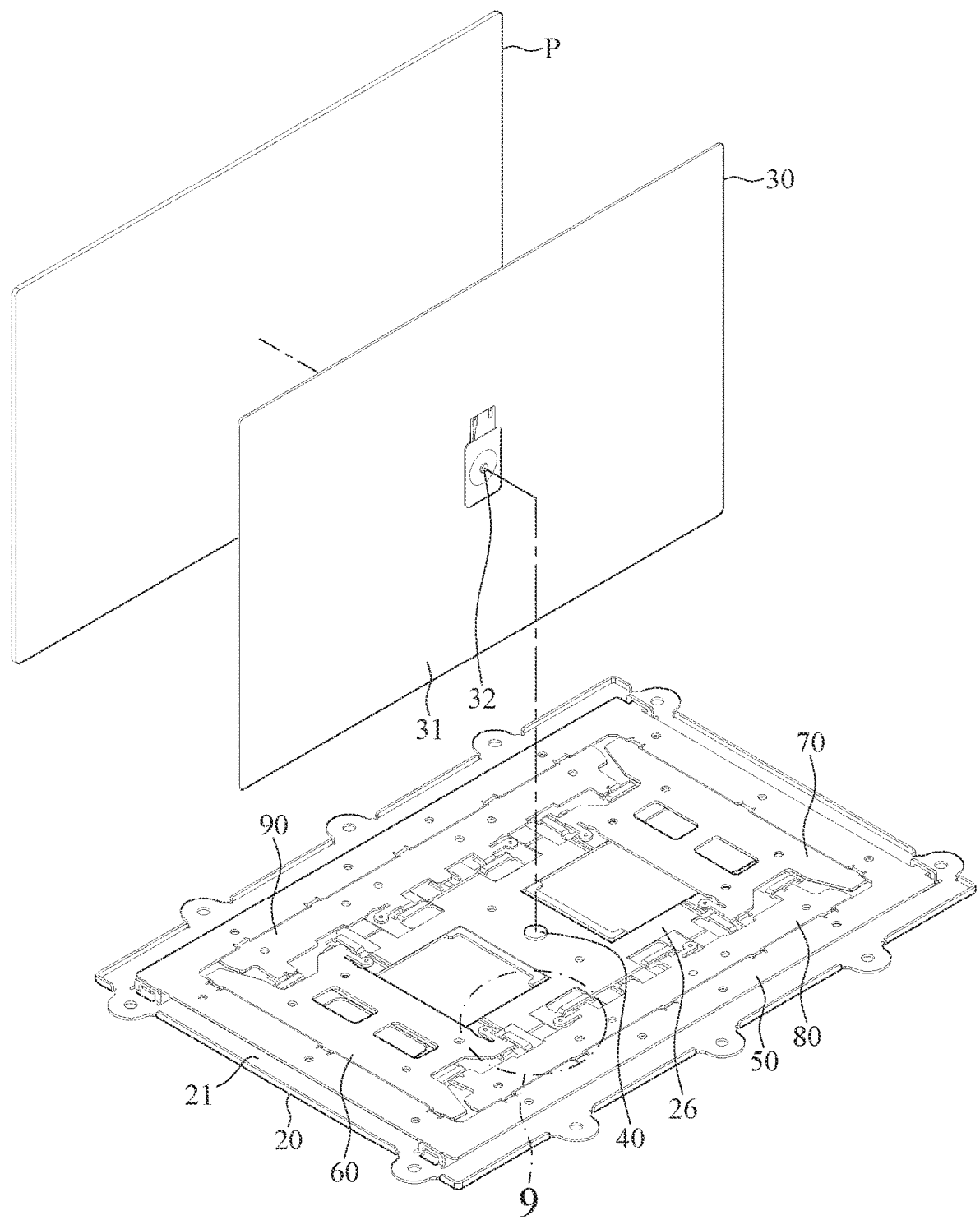
FIG. 2 illustrates an exploded view of the touchpad device of the exemplary embodiment.
Figure 3:
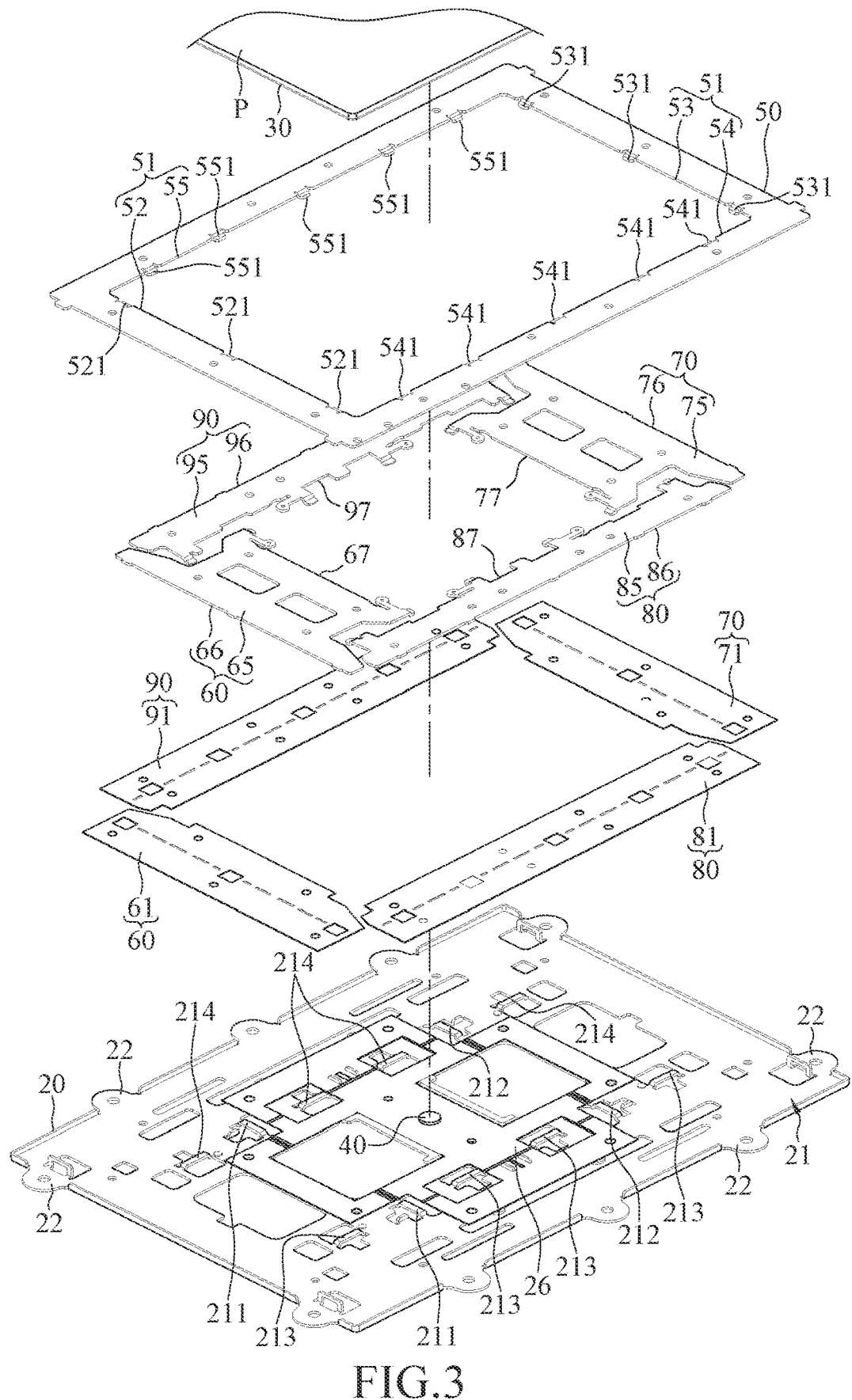
FIG. 3 illustrates another exploded view of the touchpad device of the exemplary embodiment.
Figure 4:
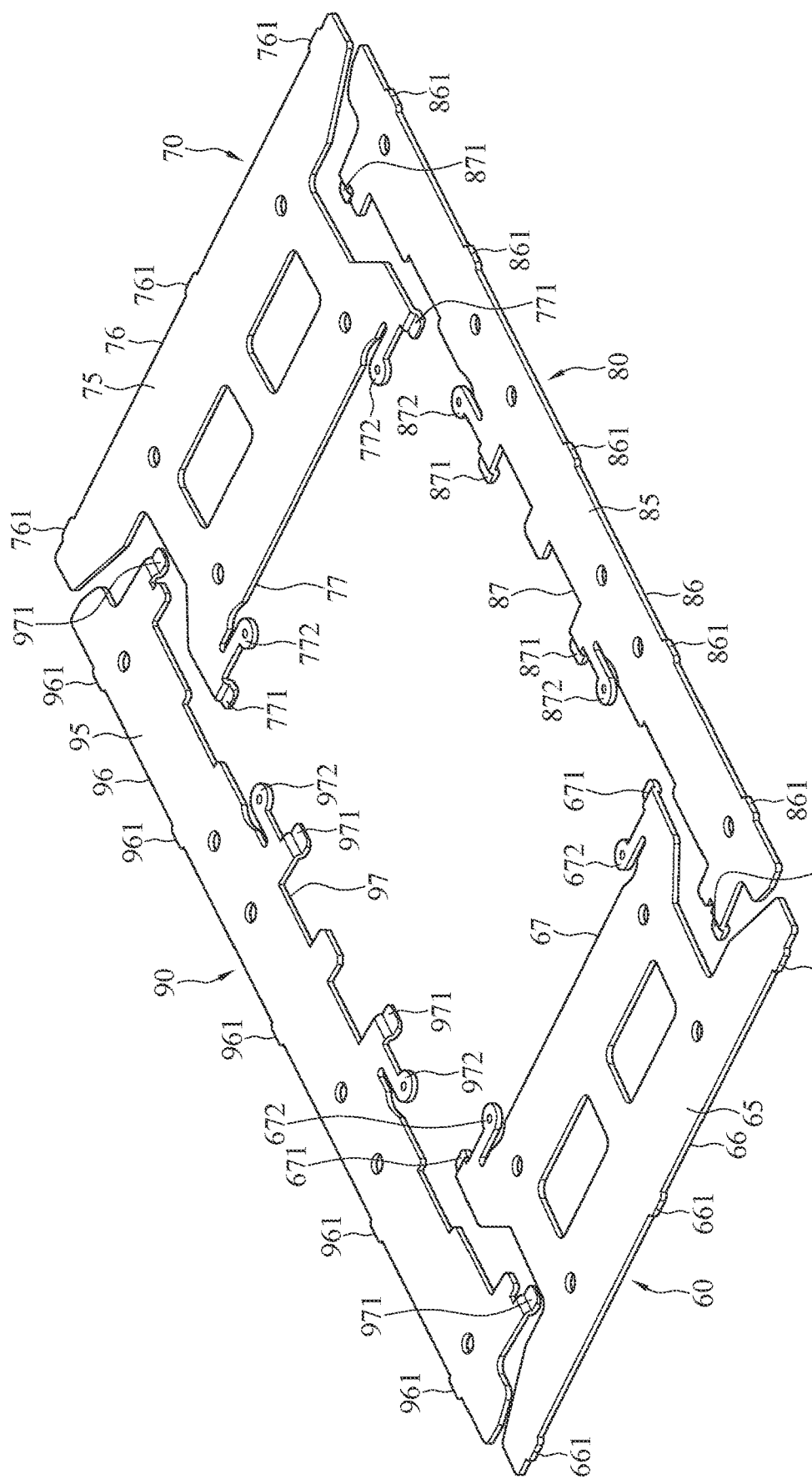
FIG. 4 illustrates a partial perspective view of the touchpad device of the exemplary embodiment.
Figure 5:
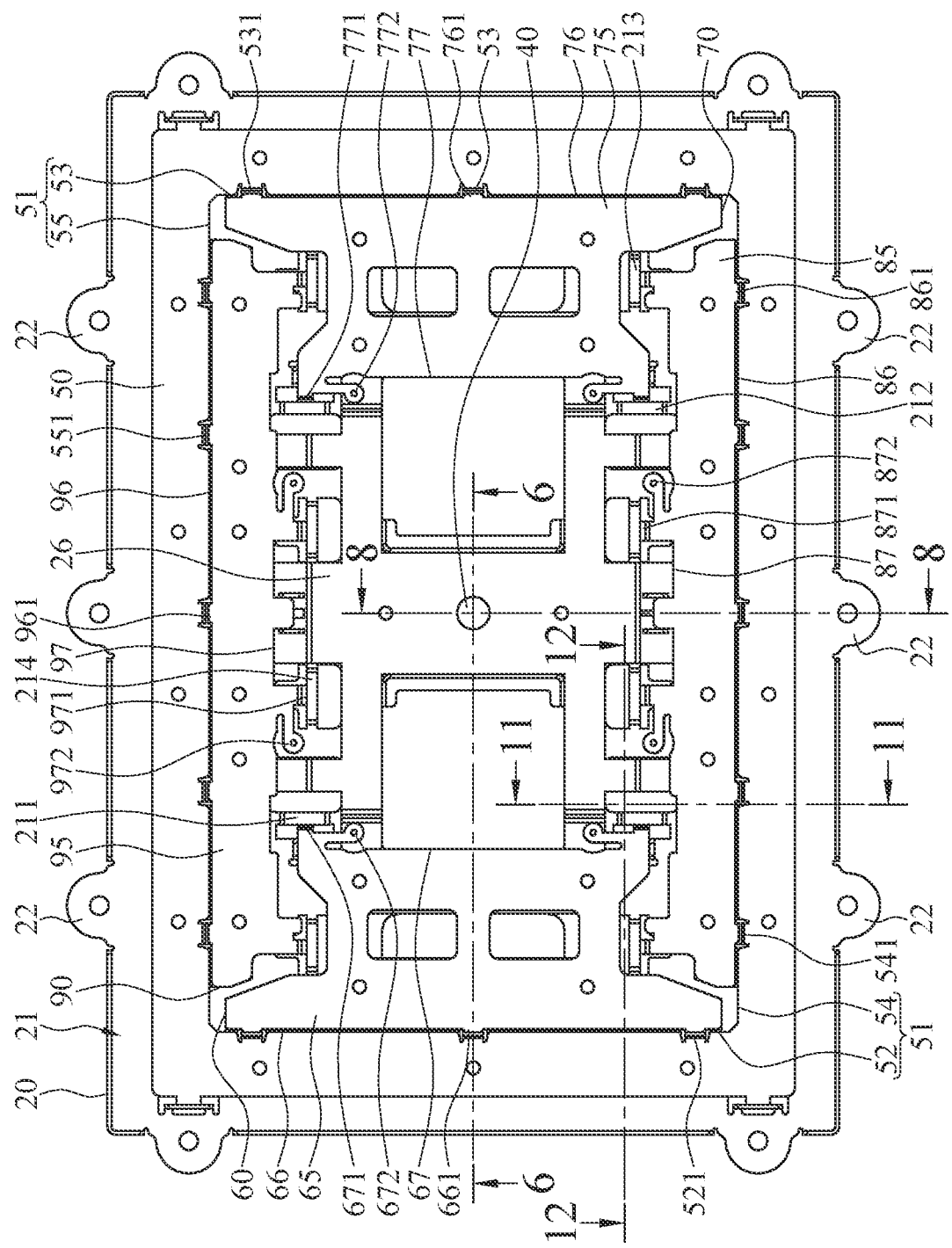
FIG. 5 illustrates a top view of the touchpad device of the exemplary embodiment.

FIG. 1 illustrates a schematic application view of a touchpad device according to an exemplary embodiment. FIG. 2 illustrates an exploded view of the touchpad device of the exemplary embodiment. FIG. 3 illustrates another exploded view of the touchpad device of the exemplary embodiment. FIG. 4 illustrates a partial perspective view of the touchpad device of the exemplary embodiment. FIG. 5 illustrates a top view of the touchpad device of the exemplary embodiment. As shown in FIGS. 1 and 2, the touchpad device T (e.g., a touchpad or a trackpad) may be applied in a computer product, and the user can operate the touchpad device T by sliding or pressing the touchpad device T with the user's finger(s) so as to control the movement of the cursor or to generate corresponding control signal(s). For example, as shown in FIG. 1, in this embodiment, the touchpad device T is applied in a notebook computer N, but embodiments are not limited thereto. In some embodiments, the touchpad device T may be applied in other portable computers (e.g., tablet computers). Alternatively, the touchpad device T may be an individual device and may be capable of externally connected to a portable computer, but embodiments are not limited thereto.

As shown in FIGS. 2 to 5, in this embodiment, the touchpad device T comprises a substrate 20, a circuit board 30, a resilient member 40, an annular plate 50, a first linkage member 60, and a second linkage member 70. The substrate 20 may be a rigid plate made of metal (e.g., iron, aluminum, alloy, etc.), or plastic material. In this embodiment, the substrate 20 has a top surface 21. The circuit board 30, the resilient member 40, the annular plate 50, the first linkage member 60, and the second linkage member 70 are all disposed above the top surface 21.

As shown in FIGS. 2 to 5, the circuit board 30 has a bottom surface 31, and the bottom surface 31 faces the top surface 21 of the substrate 20. In this embodiment, the bottom surface 31 of the circuit board 30 comprises a trigger switch 32. For example, the trigger switch 32 may be a button switch or a microswitch. In some embodiments, the circuit board 30 may be a printed circuit board (PCB), a flexible printed circuit board (FPCB), or a Rigid-Flex PCB.

As shown in FIGS. 2 to 5, the resilient member 40 is disposed between the substrate 20 and the circuit board 30. In this embodiment, the resilient member 40 is fixed (e.g., by adhering, riveting, locking, or welding) on the top surface 21 of the substrate 20 or on the bottom surface 31 of the circuit board 30, and the resilient member 40 corresponds to the trigger switch 32. The resilient member 40 makes the circuit board 30 be kept at a height position so as to keep spaced apart from the substrate 20. In some embodiments, the resilient member 40 may be a block (as shown in FIG. 2, may be a plastic block or a metal block) or a magnetic member. Alternatively, in some embodiments, the resilient member 40 may be a rubber dome, a metal dome, a spring, an elastic piece, or other elastic members, such that the resilient member 40 can store the elastic force upon being pressed.

Further, as shown in FIGS. 2 to 5, a touch panel P is disposed and stacked above the circuit board 30, and the circuit board 30 is nearer to the substrate 20 as compared with the touch panel P (namely, the distance between the circuit board 30 and the substrate 20 is less than the distance between the touch panel P and the substrate 20). The touch panel P may be a plate made of glass or polyester resin (mylar), and is provided for being touched or pressed by the user. The circuit board 30 may perform functions such as scrolling, zooming in, zooming out, opening window, or the like in response to the movement or the gesture of the user's finger(s) on the touch panel P. Alternatively, in some embodiments, the circuit board 30 may perform functions such as selecting, displaying menu, or the like in response to the click or double click of the user's finger(s) on the touch panel P. For example, when the touch panel P is pressed so as to be moved downwardly with respect to the substrate 20, the resilient member 40 and the trigger switch 32 are pressed with each other, so that the trigger switch 32 is triggered to generate signal(s). Moreover, when the touch panel P is released, if the resilient member 40 is an elastic member, the touch panel P is moved resiliently to the height position with the elastic force stored in the resilient member 40. In some embodiments, the touch panel P and the circuit board 30 may be integrated as one plate. For instance, neighboring surfaces of the touch panel P and the circuit board 30 may be combined with each other by glues, chemical adhesives (e.g., light curable adhesives), physical adhesives (e.g., thermosetting adhesives or thermoplastic adhesives), or the like, such that the touch panel P and the circuit board 30 are integrated as one plate.

As shown in FIGS. 2 to 5, the annular plate 50 is fixed around the periphery of the bottom surface 31 of the circuit board 30. The annular plate 50 may be a rigid plate made of metal or plastic, and the annular plate 50 is fixed on the bottom surface 31 of the circuit board 30 by adhering, riveting, locking, or welding.

As shown in FIGS. 2 to 5, the annular plate 50 comprises an inner periphery 51, and the inner periphery 51 comprises a first side 52, a second side 53, a third side 54, and a fourth side 55 connected to each other. The first side 52 and the second side 53 are opposite sides, and the third side 54 and the fourth side 55 are opposite sides. The annular plate 50 comprises at least one first limiting member 521 disposed on the first side 52, and the annular plate 50 comprises at least one second limiting member 531 disposed on the second side 53. In this embodiment, for example, the annular plate 50 comprises three first limiting members 521 disposed on the first side 51 and spaced apart from each other, and the annular plate 50 comprises three second limiting members 531 disposed on the second side 52 and spaced apart from each other. It should be noted that, the number of the first limiting members 521 and the second limiting members 531 in the example is for illustrative purposes, and embodiments are not limited thereto.

FIG. 6 illustrates a cross-sectional view along line 6-6 shown in FIG. 5. Please refer to FIGS. 3 and 6, in this embodiment, the first limiting member 521 is a plate integrally extending from the first side 52 of the annular plate 50. The first limiting member 521 comprises a first connection plate 5211 and a first limiting plate 5212. The first limiting plate 5212 is spaced apart from the bottom surface 31 of the circuit board 30, and the first connection plate 5211 is a bent plate connected between one end of the first limiting plate 5212 and the first side 52. Hence, the first limiting member 521 is configured as an L-shaped plate. The second limiting member 531 may also be a plate integrally extending from the second side 53 of the annular plate 50. The second limiting member 531 and the first limiting member 521 may have identical structure or similar structures, and repeated descriptions are thus omitted herein.

As shown in FIGS. 2 to 4, the first linkage member 60 and the second linkage member 70 are disposed between the substrate 20 and the circuit board 30, and the first linkage member 60 and the second linkage member 70 are respectively disposed at two opposite sides of the resilient member 40. The first linkage member 60 and the second linkage member 70 are provided for guiding the touch panel P and the circuit board 30 to move upwardly and downwardly with respect to the substrate 20. In this embodiment, the first linkage member 60 and the second linkage member 70 are symmetrical with each other, by taking the resilient member 40 as the symmetry center, but embodiments are not limited thereto. The first linkage member 60 comprises a first flexible sheet 61 and a first swing plate 65, and the second linkage member 70 comprises a second flexible sheet 71 and a second swing plate 75. In some embodiments, the first flexible sheet 61, the first swing plate 65, the second flexible sheet 71, and the second swing plate 75 may be rectangular-shaped, triangular-shaped, trapezoidal-shaped, polygonal-shaped, H-shaped, U-shaped, or irregular-shaped.

As shown in FIGS. 2 to 4, the first swing plate 65 of the first linkage member 60 comprises a first outer side 66 and a first inner side 67. The first inner side 67 is nearer to the resilient member 40, as compared with the first outer side 66 (in other words, in this embodiment, the distance between the first inner side 67 and the resilient member 40 is less than the distance between the first outer side 66 and the resilient member 40). The first swing plate 65 is swingably connected to the substrate 20 with the first inner side 67. The first outer side 66 is adjacent to the first side 52 of the annular plate 50. The first flexible sheet 61 is connected between the first outer side 66 and the annular plate 50. The second swing plate 75 of the second linkage member 70 comprises a second outer side 76 and a second inner side 77. The second inner side 77 is nearer to the resilient member 40, as compared with the second outer side 76 (in other words, in this embodiment, the distance between the second inner side 77 and the resilient member 40 is less than the distance between the second outer side 76 and the resilient member 40). The second swing plate 75 is swingably connected to the substrate 20 with the second inner side 77. The second outer side 76 is adjacent to the second side 53 of the annular plate 50. The second flexible sheet 71 is connected between the second outer side 76 and the annular plate 50.

In some embodiments, the first flexible sheet 61 and the second flexible sheet 71 may be elastic sheets having flexibility and made of plastic or metal. The rigidities of the first swing plate 65 and the second swing plate 75 may be greater than the rigidities of the first flexible sheet 61 and the second flexible sheet 71. Accordingly, the first swing plate 65 is movable with respect to the touch panel P through the flexibility of the first flexible sheet 61, and the second swing plate 75 is movable with respect to the touch panel P through the flexibility of the second flexible sheet 71. Moreover, in the case that the first flexible sheet 61 and the second flexible sheet 71 are made of plastic, the first flexible sheet 61 and the second flexible sheet 71 may be fixed with other components by adhering; in the case that the first flexible sheet 61 and the second flexible sheet 71 are made of metal, the first flexible sheet 61 and the second flexible sheet 71 may be fixed with other components by adhering, welding, riveting, or the like, but embodiments are not limited thereto.

As shown in FIGS. 2 to 4, in this embodiment, the first swing plate 65 comprises at least one first hook portion 671 disposed on the first inner side 67. In this embodiment, the number of the first hook portions 671 is two, and the two hook portions 671 are integrally extending from the first inner side 67 and bent (in this embodiment, the first hook portion 671 is L-shaped). The substrate 20 comprises first hook holder(s) 211 disposed on the top surface 21 and corresponding to the first hook portion(s) 671, and the number of the first hook holder(s) 211 corresponds to the number of the first hook portion(s) 671. In this embodiment, the first hook holders 211 integrally extend from the substrate 20, are bent, and protrude from the top surface 21. The first hook holder 211 may be a U-shaped hook holder (as shown in FIG. 3), an L-shaped hook holder, a T-shaped hook holder, or hook holders with other shaped, and embodiments are not limited thereto. Each of the first hook portions 671 of the first swing plate 65 is hooked with the corresponding first hook holder 211, so that the first swing plate 65 is swingably connected to the substrate 20 with the first inner side 67. The second swing plate 75 comprises at least one second hook portion 771 disposed on the second inner side 77. The substrate 20 comprises second hook holder(s) 212 disposed on the top surface 21 and corresponding to the second hook portion(s) 771, and the number of the second hook holder(s) 212 corresponds to the number of the second hook portion(s) 771. Each of the second hook portions 771 of the second swing plate 75 is hooked with the corresponding second hook holder 212, so that the second swing plate 75 is swingably connected to the substrate 20 with the second inner side 77. The second hook portion 771 and the first hook portion 671 may have identical structure or similar structures, and the second hook holder 212 and the first hook holder 211 may have identical structure or similar structures, and repeated descriptions are thus omitted herein.

As shown in FIGS. 2 to 4 and FIG. 6, the first swing plate 65 further comprises first limiting portion(s) 661 disposed on the first outer side 66 and corresponding to the first limiting member(s) 521, and the number of the first limiting portion(s) 661 corresponds to the number of the first limiting member(s) 521. Each of the first limiting portions 661 is sandwiched between the corresponding first limiting member 521 and the circuit board 30. For example, in this embodiment, each of the first limiting portions 661 is a plate integrally extending from the first outer side 66, and each of the first limiting portions 661 is sandwiched between the first limiting plate 5212 of the corresponding first limiting member 521 and the bottom surface 31 of the circuit board 30. Similarly, the second swing plate 75 comprises second limiting portion(s) 761 disposed on the second outer side 76 and corresponding to the second limiting member(s) 531, and the number of the second limiting portion(s) 761 corresponds to the number of the second limiting member(s) 531. Each of the second limiting portions 761 is a plate integrally extending from the second outer side 76, and each of the second limiting portions 761 is sandwiched between the corresponding second limiting member 531 and the bottom surface 31 of the circuit board 30.

Accordingly, when any portion of the touch panel P (e.g., any corner or any edge of the touch panel P) is pressed, the trigger switch 32 of the circuit board 30 and the resilient member 40 come close to, abut against, and press with each other through the first linkage member 60 and the second linkage member 70, thereby generating pressing feelings of the touchpad device T for the user and generating corresponding signal(s). Please refer to FIGS. 6 and 7. FIG. 7 illustrates a schematic view showing that the touchpad device in FIG. 6 is being pressed. In this embodiment, when a corner portion, an edge portion, or a region of the touch panel P adjacent to the first linkage member 60 is pressed (as indicated by the arrow L shown in FIG. 7), the touch panel P is driven to move downwardly by the first linkage member 60 to come close to the top surface 21 of the substrate 20. Specifically, in this embodiment, the pressing force of the touch panel P may be transmitted to the first inner side 67 through the linkage of the first flexible sheet 61 and the first swing plate 65, so that the first swing plate 65 can swing with respect to the substrate 20 by taking the first inner side 67 as the swing center, owing to the flexibility of the first flexible sheet 61. Hence, the touch panel P is driven to move downwardly and to come close to the top surface 21 of the substrate 20 to trigger the trigger switch 32 generating corresponding signal(s). Similarly, when a corner portion, an edge portion, or a region of the touch panel P adjacent to the second linkage member 70 is pressed, the pressing force drives the second linkage member 70 to swing, and the second linkage member 70 drives the touch panel P to move downwardly and to come close to the top surface 21 of the substrate 20 to trigger the trigger switch 32 generating corresponding signal(s), repeated descriptions are omitted herein. As above, when any edge or corner of the touch panel P is pressed, the touch panel P can be moved upwardly and downwardly more stably through the linkage of the first linkage member 60 and the second linkage member 70, thereby effectively reducing the operation noise and wobbling of the touchpad device T as well as improving the operation feelings for the user.

Moreover, as shown in FIGS. 3, 4, and 7, the first limiting portion 661 disposed on the first outer side 66 of the first swing plate 65 is sandwiched between the first limiting member 521 and the bottom surface 31 of the circuit board 30, and the second limiting portion 761 disposed on the second outer side 76 of the second swing plate 75 is sandwiched between the second limiting member 531 and the bottom surface 31 of the circuit board 30. Therefore, during the swinging operations of the first swing plate 65 and the second swing plate 75, deflections or wobbling of the first swing plate 65 and the second swing plate 75 can be prevented effectively, thereby reducing the operation noise of the touchpad device T as well as improving the operation feelings for the user.

As shown in FIGS. 2 to 4, in this embodiment, the touchpad device T further comprises a third linkage member 80 and a fourth linkage member 90. The third linkage member 80 and the fourth linkage member 90 are disposed between the substrate 20 and the circuit board 30, and the third linkage member 80 and the fourth linkage member 90 are respectively adjacent to the third side 54 and the fourth side 55 of the annular plate 50. The third linkage member 80 and the fourth linkage member 90 are provided for guiding the touch panel P and the circuit board 30 to move upwardly and downwardly with respect to the substrate 20. In this embodiment, the third linkage member 80 and the fourth linkage member 90 are symmetrical with each other, by taking the resilient member 40 as the symmetry center, but embodiments are not limited thereto. Specifically, in this embodiment, four sides of the annular plate 50 are respectively connected to the first linkage member 60, the second linkage member 70, the third linkage member 80, and the fourth linkage member 90. Therefore, when any edge or any corner of the touch panel P is pressed, the touch panel P can be moved upwardly and downwardly more stably further through the linkage of the third linkage member 80 and the fourth linkage member 90, thereby effectively reducing the operation noise and wobbling of the touchpad device T as well as improving the operation feelings for the user.

As shown in FIGS. 1 to 4, the third linkage member 80 comprises a third flexible sheet 81 and a third swing plate 85, and the fourth linkage member 90 comprises a fourth flexible sheet 91 and a fourth swing plate 95. In this embodiment, the third swing plate 85 and the fourth swing plate 95 are elongated plates and have shapes different from the first swing plate 65 and the second swing plate 75, but embodiments are not limited thereto. In some embodiments, the third flexible sheet 81, the third swing plate 85, the fourth flexible sheet 91, and the fourth swing plate 95 may be rectangular-shaped, triangular-shaped, trapezoidal-shaped, polygonal-shaped, H-shaped, U-shaped, or irregular-shaped.

As shown in FIGS. 2 to 4, the third swing plate 85 of the third linkage member 80 comprises a first outer side 86 and a first inner side 87. The third inner side 87 is nearer to the resilient member 40, as compared with the third outer side 86 (in other words, in this embodiment, the distance between the third inner side 87 and the resilient member 40 is less than the distance between the third outer side 86 and the resilient member 40). The third swing plate 85 is swingably connected to the substrate 20 through the third inner side 87. The third outer side 86 is adjacent to the third side 54 of the annular plate 50. The third flexible sheet 81 is connected between the third outer side 86 and the annular plate 50. The fourth swing plate 95 of the fourth linkage member 90 comprises a fourth outer side 96 and a fourth inner side 97. The fourth inner side 97 is nearer to the resilient member 40, as compared with the fourth outer side 96 (in other words, in this embodiment, the distance between the fourth inner side 97 and the resilient member 40 is less than the distance between the fourth outer side 96 and the resilient member 40). The fourth swing plate 95 is swingably connected to the substrate 20 through the fourth inner side 97. The fourth outer side 96 is adjacent to the fourth side 55 of the annular plate 50. The fourth flexible sheet 91 is connected between the fourth outer side 96 and the annular plate 50.

In some embodiments, the third flexible sheet 81 and the fourth flexible sheet 91 may be elastic sheets having flexibility and made of plastic or metal. The rigidities of the third swing plate 85 and the fourth swing plate 95 may be greater than the rigidities of the third flexible sheet 81 and the fourth flexible sheet 91. Accordingly, the third swing plate 85 is movable with respect to the touch panel P through the flexibility of the third flexible sheet 81, and the fourth swing plate 95 is movable with respect to the touch panel P through the flexibility of the fourth flexible sheet 91. The operations of the third linkage member 80 and the fourth linkage member 90 may be identical with the operations of the first linkage member 60 and the second linkage member 70, and repeated descriptions are thus omitted herein.

As shown in FIGS. 2 to 4, in this embodiment, the annular plate 50 comprises at least one third limiting member 541 disposed on the third side 54, and the annular plate 50 comprises at least one fourth limiting member 551 disposed on the fourth side 55. For example, in this embodiment, the annular plate 50 comprises five third limiting members 541 disposed on the third side 54 and spaced apart from each other, and the annular plate 50 comprises five fourth limiting members 551 disposed on the fourth side 55 and spaced apart from each other. It should be noted that, the number of the third limiting members 541 and the fourth limiting members 551 in the example is for illustrative purposes, but embodiments are not limited thereto.

FIG. 8 illustrates a cross-sectional view along line 8-8 shown in FIG. 5. As shown in FIG. 8, in this embodiment, the third limiting member 541 is a plate integrally extending from the third side 54 of the annular plate 50. The third limiting member 541 comprises a third connection plate 5411 and a third limiting plate 5412. The third limiting plate 5412 is spaced apart from the bottom surface 31 of the circuit board 30, and the third connection plate 5411 is a bent plate connected between one end of the third limiting plate 5412 and the third side 54. Hence, the third limiting member 541 is configured as an L-shaped plate. The fourth limiting member 551 may also be a plate integrally extending from the fourth side 55 of the annular plate 50. The fourth limiting member 551 and the third limiting member 541 may have identical structure or similar structures, and repeated descriptions are thus omitted herein.

Furthermore, as shown in FIGS. 2 to 4, in this embodiment, the third swing plate 85 comprises at least one third hook portion 871 disposed on the third inner side 87, and the fourth swing plate 95 comprises at least one fourth hook portion 971 disposed on the fourth inner side 97. The substrate 20 comprises third hook holder(s) 213 and fourth hook holder(s) 214 which are disposed on the top surface 21, and the third hook holder(s) 213 and fourth hook holder(s) 214 correspond to the third hook portion(s) 871 and the fourth hook portion(s) 971 respectively. The number of the third hook holder(s) 213 corresponds to the number of the third hook portion(s) 871, and the number of the fourth hook holder(s) 214 corresponds to the number of the fourth hook portion(s) 971. Each of the third hook portions 871 of the third swing plate 85 is hooked with the corresponding third hook holder 213, so that the third swing plate 85 is swingably connected to the substrate 20 with the third inner side 87. Each of the fourth hook portions 971 of the fourth swing plate 95 is hooked with the corresponding fourth hook holder 214, so that the fourth swing plate 95 is swingably connected to the substrate 20 with the fourth inner side 97. The first hook portion 671, the second hook portion 771, the third hook portion 871, and the fourth hook portion 971 may have identical structure or similar structures, and the first hook holder 211, the second hook holder 212, the third hook holder 213, and the fourth hook holder 214 may have identical structure or similar structures, and repeated descriptions are thus omitted herein.

As shown in FIGS. 2 to 4, the third swing plate 85 further comprises third limiting portion(s) 861 disposed on the third outer side 86 and corresponding to the third limiting member(s) 541, and the fourth swing plate 95 comprises fourth limiting portion(s) 961 disposed on the fourth outer side 96 and corresponding to the fourth limiting member(s) 551. The number of the third limiting portion(s) 861 corresponds to the number of the third limiting member(s) 541, and the number of the fourth limiting portion(s) 961 corresponds to the number of the fourth limiting member(s) 551. Moreover, each of the third limiting portions 861 is sandwiched between the corresponding third limiting member 541 and the bottom surface 31 of the circuit board 30, and each of the fourth limiting portions 961 is sandwiched between the corresponding fourth limiting member 551 and the bottom surface 31 of the circuit board 30. Therefore, during the swinging operations of the third swing plate 85 and the fourth swing plate 95, deflections or wobbling of the third swing plate 85 and the fourth swing plate 95 can be prevented effectively, thereby reducing the operation noise of the touchpad device T as well as improving the operation feelings for the user. In some embodiments, the structures of the third limiting portion 861 and the fourth limiting portion 961 may be identical or similar to the structures of the first limiting portion 661 and the second limiting portion 761, and repeated descriptions are thus omitted herein.

Figure 9:
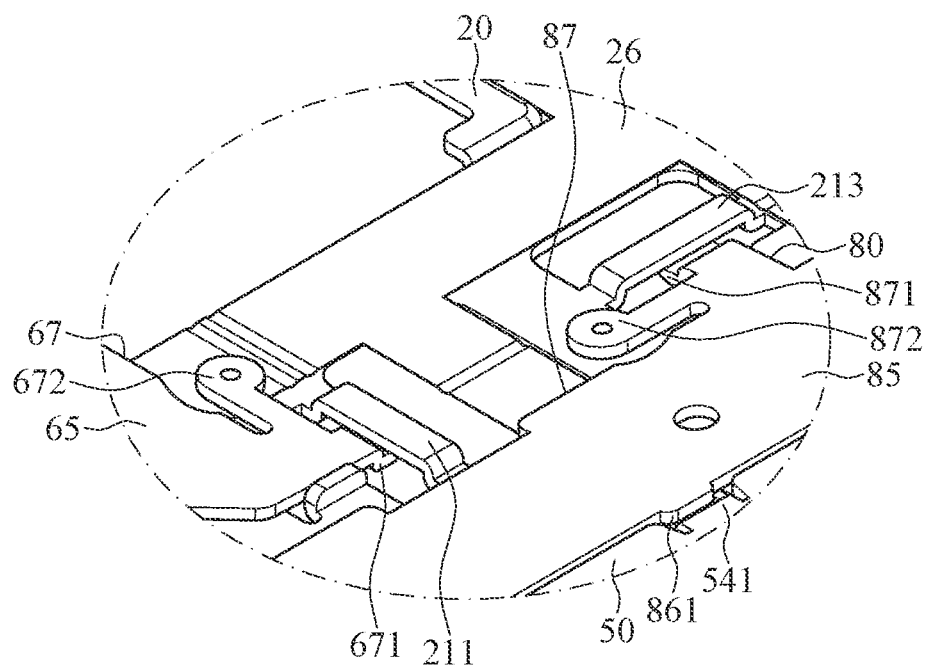
FIG. 9 illustrates an enlarged partial view of FIG. 2.
Figure 10:
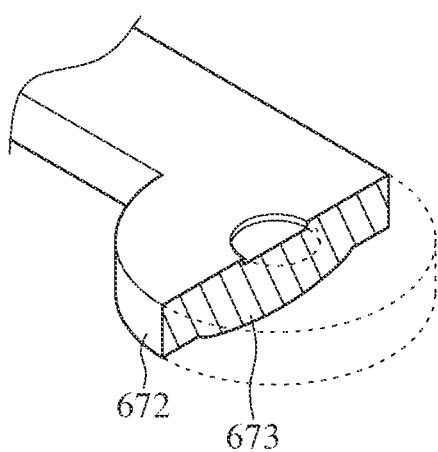
FIG. 10 illustrates a partial cross-sectional view of FIG. 9.
Figure 11:
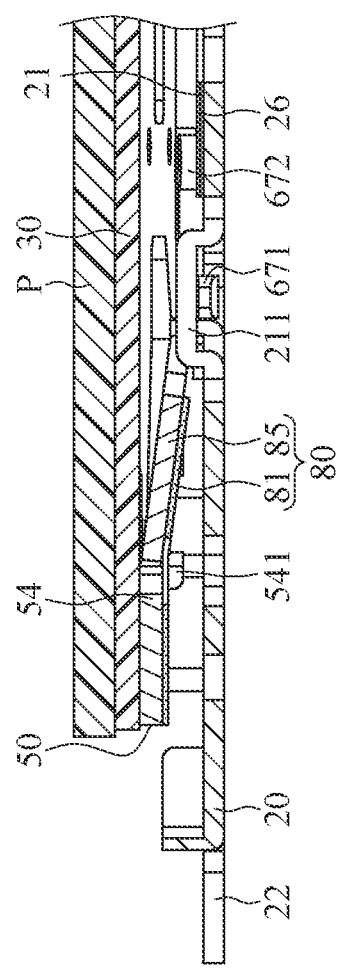
FIG. 11 illustrates a cross-sectional view along line 11-11 shown in FIG. 5.
Figure 12:
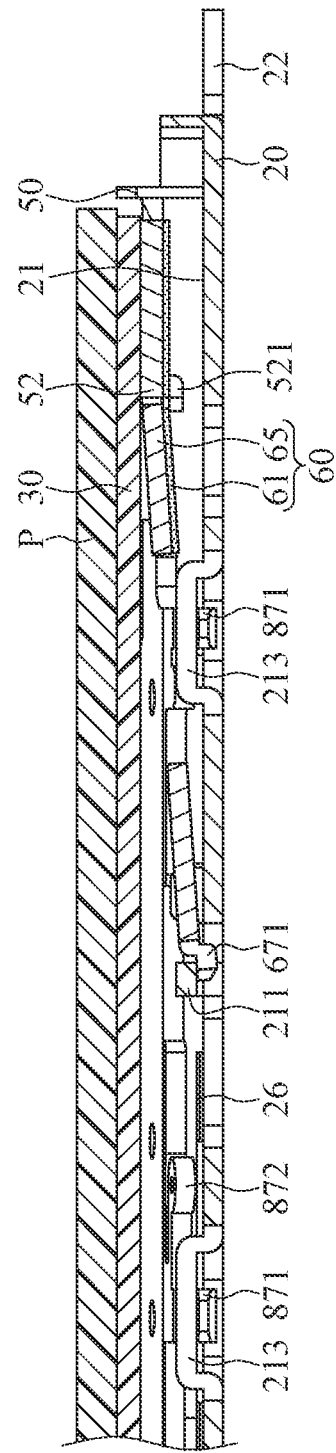
FIG. 12 illustrates a cross-sectional view along line 12-12 shown in FIG. 5.

FIG. 9 illustrates an enlarged partial view of FIG. 2. FIG. 10 illustrates a partial cross-sectional view of FIG. 9. FIG. 11 illustrates a cross-sectional view along line 11-11 shown in FIG. 5. FIG. 12 illustrates a cross-sectional view along line 12-12 shown in FIG. 5. Please refer to FIGS. 4 and 9 to 12, in this embodiment, the first swing plate 65 of the first linkage member 60 further comprises at least one first elastic arm 672 disposed on the first inner side 67. In this embodiment, the number of the first elastic arms 672 is two, and the two first elastic arms 672 integrally extend from the first inner side 67. An end portion of each of the first elastic arms 672 abuts against the top surface 21 of the substrate 20 (as shown in FIG. 11), so that the clearance such as tolerances between the first linkage member 60 and the substrate 20 can be eliminated. Hence, when the touch panel P is pressed, the touch panel P can be prevented from the wobbling or shaking caused by the clearance, thereby further improving the operation feelings of the touchpad device T for the user. Moreover, as shown in FIG. 10, in this embodiment, the end portion of the first elastic arm 672 has a bump 673, and the first elastic arm 672 abuts against the top surface 21 of the substrate 20 with the bump 673. Hence, the interference area between the first elastic arm 672 and the substrate 20 can be reduced thereby preventing the first linkage member 60 to have an excessive resisting force during the operation.

Furthermore, as shown in FIG. 4, likewise, the second swing plate 75 of the second linkage member 70 may further comprise at least one second elastic arm 772 disposed on the second inner side 77 to abut against the top surface 21 of the substrate 20, the third swing plate 85 of the third linkage member 80 may further comprise at least one third elastic arm 872 disposed on the third inner side 87 to abut against the top surface 21 of the substrate 20 (as shown in FIG. 12), and the fourth swing plate 95 of the fourth linkage member 90 may further comprise at least one fourth elastic arm 972 disposed on the fourth inner side 97 to abut against the top surface 21 of the substrate 20. The clearance between the first linkage member 60, the second linkage member 70, the third linkage member 80, the fourth linkage member 90, and the substrate 20 can be eliminated. Hence, when the touch panel P is pressed, the touch panel P can be prevented from the wobbling or shaking caused by the clearances.

Further, as shown in FIGS. 2 to 4 and 6, in this embodiment, the touchpad device T further comprises a flexible plate 26, and the flexible plate 26 may be an elastic sheet having flexibility and made of plastic or metal. Moreover, the flexible plate 26 is connected between the first inner side 67 of the first swing plate 65, the second inner side 77 of the second swing plate 75, the third inner side 87 of the third swing plate 85, the fourth inner side 97 of the fourth swing plate 95, and the substrate 20. Therefore, the limiting of the first swing plate 65, the second limiting plate 75, the third limiting plate 85, and the fourth limiting plate 95 can be improved. Moreover, in this embodiment, the resilient member 40 is fixed on the flexible plate 26; for example, the resilient member 40 may be fixed on the surface of the flexible plate 26 by adhering, but embodiments are not limited thereto.

Figure 13:
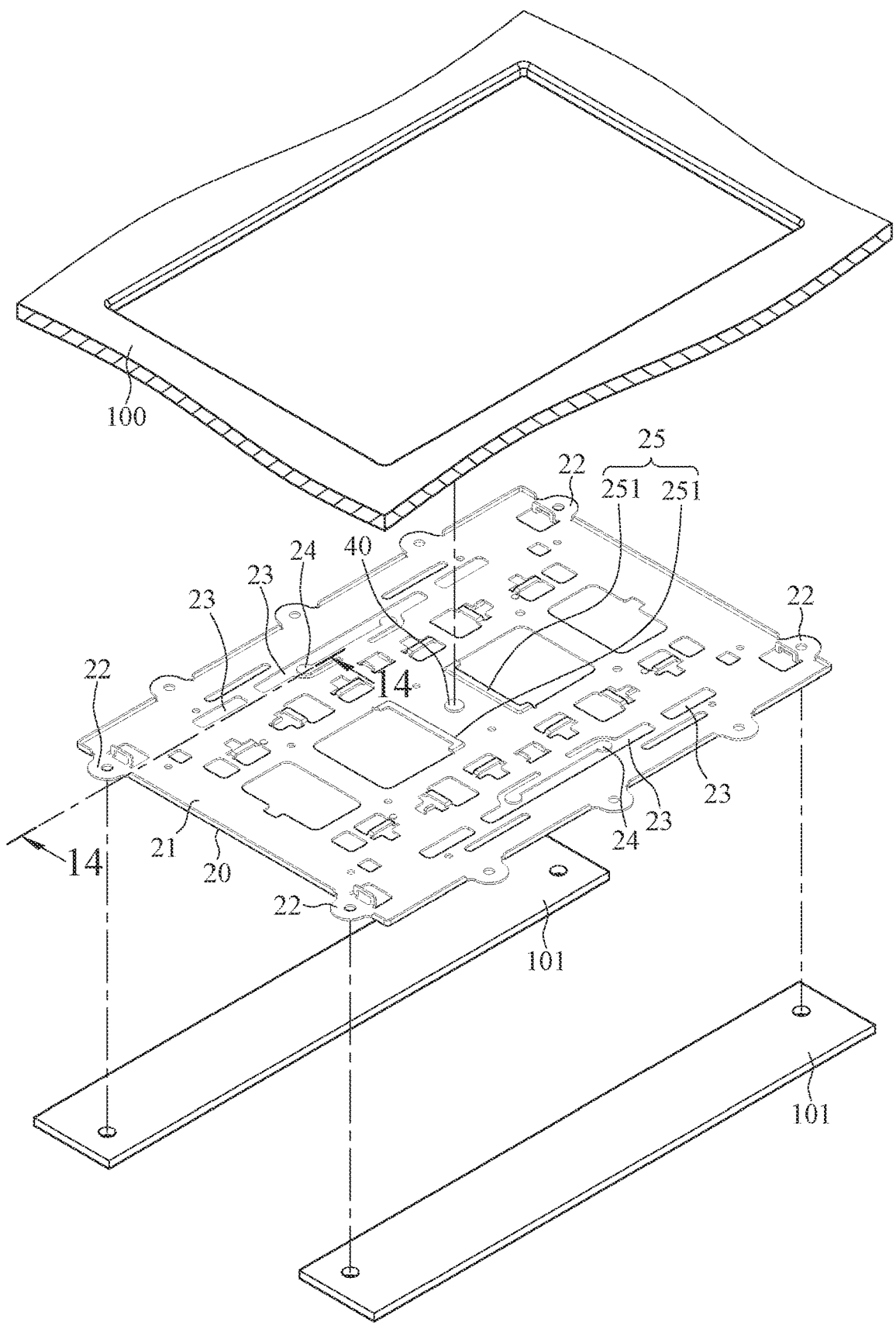
FIG. 13 illustrates an exploded view of a touchpad device according to another exemplary embodiment of the instant disclosure.

FIG. 13 illustrates an exploded view of a touchpad device according to another exemplary embodiment of the instant disclosure. As shown in FIG. 13, in this embodiment, the substrate 20 further comprises a reinforcement structure 25, and the reinforcement structure 25 is adjacent to the resilient member 40. The reinforcement structure 25 may be at least one folded plate 251 integrally extending from the substrate 20. In this embodiment, the number of the folded plates 251 is two, and the two folded plates 251 are respectively disposed at two opposite sides of the resilient member 40. For example, the folded plates 251 may be formed by applying stamping process or drawing process to the substrate 20. Accordingly, the reinforcement structure 25 can improve the structural strength of a region of the substrate 20 adjacent to the resilient member 40, thereby preventing the deformation of the region of the substrate 20 that affects the triggering performance of the trigger switch 32 or the operations feelings of the user. Moreover, in this embodiment, the length of the reinforcement structure 25 is greater than the length of the resilient member 40. Therefore, the region of the substrate 20 adjacent to the resilient member 40 can have a better structural reinforcement effect.

Moreover, as shown in FIG. 13, the substrate 20 further comprises at least one fixation portion 22 and at least one hollow hole 23. In this embodiment, the substrate 20 comprises a plurality of fixation portions 22 at a periphery of the substrate 20, and the fixation portions 22 are provided for assembling with the frames 100, 101 nearby. For example, the frames 100, 101 may be parts of the housing of the touchpad device T. The substrate 20 also comprises a plurality of hollow holes 23 between the fixation portions 22 and the resilient member 40. Accordingly, if the fixation portion 22 or the region of the substrate 20 adjacent to the fixation portion 22 is deformed after the fixation portion 22 is fixed with the frame 100, 101, the hollow hole 23 can prevent such deformation from affecting the region of the substrate 20 adjacent to the resilient member 40. Therefore, the region of the substrate 20 adjacent to the resilient member 40 can be kept flat to prevent from affecting the trigger effect.

Figure 14:
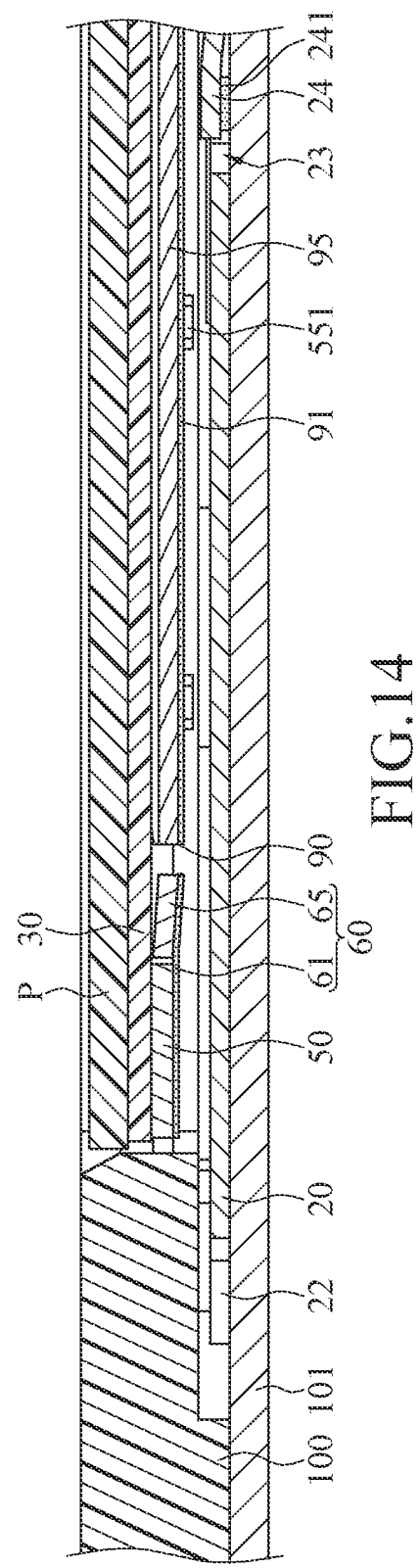
FIG. 14 illustrates a cross-sectional view along line 14-14 shown in FIG. 13.

FIG. 14 illustrates a cross-sectional view along line 14-14 shown in FIG. 13. Please refer to FIGS. 13 and 14. The substrate 20 further comprises at least one elastic arm 24. In this embodiment, the substrate 20 comprises a plurality of elastic arms 24 in the hollow holes 23, respectively. An end portion of each of the elastic arms 24 abuts against the frame 100, 101 assembled with the substrate 20. For example, the end portion of each of the elastic arms 24 may directly abut against the frame 100, 101 or may indirectly abut against the frame 100, 101 through an elastic member 24. Accordingly, since the elastic arm 24 is integrally connected to the portion of the substrate 20 adjacent to the resilient member 40, the rigidity of the region of the substrate 20 adjacent to the resilient member 40 can be improved. Therefore, when the touch panel P is pressed, the trigger switch 32 of the circuit board 30 can be triggered more quickly, thereby allowing the touchpad device T to have better operation feelings for the user.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:
a substrate comprising a top surface;
a circuit board disposed above the top surface of the substrate, wherein the circuit board comprises a bottom surface facing the top surface;
a resilient member disposed between the substrate and the circuit board, wherein the resilient member makes the circuit board be kept at a height position;
an annular plate fixed around the bottom surface of the circuit board, wherein the annular plate comprises an inner periphery, and the inner periphery comprises a first side, a second side, a third side, and a fourth side connected to each other; the first side and the second side are opposite sides, the third side and the fourth side are opposite sides, and the annular plate comprises a first limiting member disposed on the first side; and
a first linkage member and a second linkage member disposed between the substrate and the circuit board, wherein the first linkage member and the second linkage member are respectively disposed at two opposite sides of the resilient member; the first linkage member comprises a first swing plate, the first swing plate comprises a first outer side and a first inner side, the first swing plate is swingably connected to the substrate with the first inner side, the first outer side is adjacent to the first side, and the first outer side is sandwiched between the first limiting member and the circuit board.

2. The touchpad device according to claim 1, wherein the first limiting member comprises a first connection plate and a first limiting plate, the first limiting plate is spaced apart from the bottom surface of the circuit board, and the first connection plate is connected between the first limiting plate and the first side.

3. The touchpad device according to claim 1, wherein the first linkage member has a first limiting portion disposed on the first outer side, and the first limiting portion is sandwiched between the first limiting member and the circuit board.

4. The touchpad device according to claim 3, wherein the first limiting portion is a plate integrally extending from the first outer side.

5. The touchpad device according to claim 1, wherein the first swing plate comprises a first hook portion disposed on the first inner side, the substrate comprises first a hook holder disposed on the top surface, and the first hook portion is hooked with the first hook holder, so that the first inner side is swingably connected to the substrate.

6. The touchpad device according to claim 1, wherein the first swing plate comprises a first elastic arm disposed on the first inner side, and an end portion of the first elastic arm abuts against the top surface of the substrate.

7. The touchpad device according to claim 6, wherein the end portion of the first elastic arm comprises a bump, and the first elastic arm abuts against the top surface of the substrate with the bump.

8. The touchpad device according to claim 1, wherein the annular plate comprises a second limiting member disposed on the second side, the second linkage member comprises a second swing plate, the second swing plate comprises a second outer side and a second inner side, the second swing plate is swingably connected to the substrate with the second inner side, the second outer side is adjacent to the second side, and the second outer side is sandwiched between the second limiting member and the circuit board.

9. The touchpad device according to claim 8, wherein the first linkage member comprises a first flexible sheet, and the first flexible sheet is connected between the first outer side and the annular plate; the second linkage member comprises a second flexible sheet, and the second flexible sheet is connected between the second outer side and the annular plate.

10. The touchpad device according to claim 1, further comprising a third linkage member and a fourth linkage member, wherein the third linkage member and the fourth linkage member are disposed between the substrate and the circuit board, wherein the third linkage member comprises a third swing plate, the third swing plate comprises a third outer side and a third inner side, the third swing plate is swingably connected to the substrate with the third inner side, and the third outer side is adjacent to the third side and is swingably connected to the annular plate; the fourth linkage member comprises a fourth swing plate, the fourth swing plate comprises a fourth outer side and a fourth inner side, the fourth swing plate is swingably connected to the substrate with the fourth inner side, and the fourth outer side is adjacent to the fourth side and is swingably connected to the annular plate.

11. The touchpad device according to claim 10, wherein the third linkage member comprises a third flexible sheet, and the third flexible sheet is connected between the third outer side and the annular plate; the fourth linkage member comprises a fourth flexible sheet, and the fourth flexible sheet is connected between the fourth outer side and the annular plate.

12. The touchpad device according to claim 10, wherein the annular plate comprises a third limiting member disposed on the third side, the third linkage member has a third limiting portion disposed on the third outer side, and the third limiting portion is sandwiched between the third limiting member and the circuit board; the annular plate comprises a fourth limiting member disposed on the fourth side, the fourth linkage member has a fourth limiting portion disposed on the fourth outer side, and the fourth limiting portion is sandwiched between the fourth limiting member and the circuit board.

13. The touchpad device according to claim 1, wherein the substrate comprises a fixation portion and a hollow hole, the fixation portion is at a periphery of the substrate, and the hollow hole is between the fixation portion and the resilient member.

14. The touchpad device according to claim 13, wherein the substrate further comprises an elastic arm, the fixation portion of the substrate is fixed on a frame, the elastic arm is in the hollow hole, and an end portion of the elastic arm abuts against the frame.

15. The touchpad device according to claim 1, wherein the substrate further comprises a reinforcement structure, and the reinforcement structure is adjacent to the resilient member.

16. The touchpad device according to claim 15, wherein the reinforcement structure is at least one folded plate.

17. The touchpad device according to claim 15, wherein a length of the reinforcement structure is greater than a length of the resilient member.

18. The touchpad device according to claim 1, further comprising a flexible plate connected between the first inner side of the first swing plate and the substrate.

19. The touchpad device according to claim 1, wherein the circuit board comprises a trigger switch disposed on the bottom surface, and the resilient member corresponds to the trigger switch.

\* \* \* \* \*